Patented Oct. 9, 1934

1,975,954

UNITED STATES PATENT OFFICE 1,975,954

METHOD OF PRODUCING MAGNESIA DEFICIENT IN LIME AND CALCIUM NITRATE FROM DOLOMITE

Otto Kippe, Osnabruck, Hanover, Germany, assignor to Klöckner-Werke A.-G., Westphalia, Germany No Drawing. Application August 28, 1933, Serial No. 687,170. In Germany September 2, 1932

2 Claims. (Cl. 23—201)

This invention relates to a method of producing magnesia deficient in lime and calcium nitrate from dolomite.

Numerous experiments and proposals concerning the production of magnesia from dolomite by separating the lime as completely as possible from the magnesia have been made already. It has been proposed, for instance, to treat calcined dolomite with ammonium salts, such as ammonium chloride and ammonium nitrate, to cause the lime to pass into solution as calcium chloride or calcium nitrate while ammonia is set free and magnesia remains undissolved and can be separated by filtration. However, these methods can be carried out or yield a magnesia poor in lime only if the ammonium salts are used in very diluted solutions, so that the lime salts formed will naturally accrue in such weak solutions that an economical production say of calcium nitrate is not possible. Moreover, the entire amount of dolomite must be calcined and the quantities of ammonium salts required are so great that the production of magnesia and calcium nitrate becomes too expensive. For example, to obtain 100 kilograms of magnesia requires 600 kilograms ammonium nitrate, corresponding to 125 kilograms $NH_3$, while the accruing calcium nitrate liquor contains only 10% calcium nitrate.

Recently methods of producing magnesia and calcium nitrate from dolomite have been proposed which, compared with the methods just described, afford the advantage that only a portion of the dolomite is calcined and ammonium salts are not needed. According to these methods, crude dolomite is dissolved in nitric acid and the magnesia precipitated from this solution by means of lime, particularly in the form of calcined dolomite. It has been found in this connection that magnesia deficient in lime can be obtained only if lime is used in the form of milk of lime or of dolomite which, furthermore, must be freed by means of fine sieves or other devices from all particles that are not very fine. By employing such milk of lime or of dolomite the calcium nitrate solution obtained is still so thin—25%—that the evaporation thereof involves considerable cost.

The present invention makes it possible to obtain a magnesia poor in lime as well as a concentrated calcium nitrate solution and, in addition, to use a precipitant in the form of solid lime or calcined dolomite by carrying out precipitation in the presence of small amounts of ammonia or ammonium salts, such as ammonium nitrate.

This surprising effect of ammonia is indicated by the following experiments:

If 250 g. of crude dolomite of 34% CaO and 18% MgO are each dissolved in 750 cm³ nitric acid of 1.23 specific gravity and if to this solution, under stirring, are added
(1) 95 g. calcined dolomite, ground and passed through a 400-mesh sieve, and (2) first, under stirring, 100 cm³ 25% ammonia and then 95 g. calcined dolomite, if the magnesium hydroxide is filtered off by suction, if further washing out takes place with 650 cm³ water, and the residue is dried and calcined, magnesia having the following lime contents will be obtained:

|   | Yield | %CaO |
|---|---|---|
| 1 | 90 g. | 19.0 |
| 2 | 80 g. | 0.2 |

The accruing calcium nitrate solution disclosed a content of 38% $Ca(NO_3)_2$.

This favorable effect of ammonia, which, besides facilitating the production of magnesia deficient in lime, renders the utilization of lime in the form of calcium nitrate more economical, is probably due, as detailed research work has shown, to the fact that ammonia eliminates the grit-forming and detrimental influence of calcium and magnesium nitrate upon the conversion with solid lime or calcined dolomite to such an extent that complete conversion can take place. The addition of ammonia to the solution of dolomite in nitric acid causes at first a precipitation of ferric and aluminium hydroxides which if desired can be removed by filtration to reduce the ferric oxide content of magnesia, the reduction of which is sometimes quite valuable. During continued addition magnesium hydroxide is precipitated under formation of dissolved ammonium-magnesium-nitrates. By adding lime in the form of solid lime or calcined dolomite in small lumps, in ground condition or pulverized and entirely or partly slaked ammonia is continually set free, which then precipitates further amounts of magnesium hydroxide from the solution and hydrates the lime or calcined dolomite and renders them suitable for conversion. The ammonia acts here like a catalyzer.

The accruing concentrated ammoniacal calcium nitrate lye is evaporated to form solid calcium nitrate, the ammonia passing over first being recovered and can be used for new conversions.

The ammoniacal calcium nitrate lye may also advantageously be neutralized, e. g. with nitric acid, to produce calcium nitrate with ammonium nitrate, which is known to be a fertilizer possessing special keeping qualities. It is of course possible to successfully employ this concentrated calcium nitrate solution wherever calcium nitrate solutions are used.

Instead of ammonia in liquid, gaseous or aqueous solution ammonium salts, especially ammonium nitrate, may be used, since ammonia is set free therefrom by the conversion with lime.

It is of course possible to add ammonia during the known use of milk of lime or of dolomite to attain a more favorable conversion, though the economy of the new method is not materially increased thereby, owing to the lower yield of the accruing calcium nitrate lyes.

The technical advance afforded by the new method consists in the easy production of magnesia that is technically free from lime and in the small amount of energy required in consequence of obtaining a concentrated calcium nitrate solution.

It is no longer necessary to use milk of lime or of dolomite that is specially strained which, furtheremore, suffers from the drawback that the accruing calcium nitrate solution will be too much diluted. Moreover, considerable technical advantages are attained compared with known methods on account of the calcination of only a portion of the dolomite, the use of small amounts of ammonia and the direct production of a concentrated $Ca(NO_3)_2$ solution.

*Example I*

100 kg. crude dolomite containing 34% CaO and 18% MgO as carbonates are dissolved in 300 liters of nitric acid 1.23; to this solution 5 kg. of liquid ammonia are added and then, under stirring, 26 kg. quicklime in lumps or in ground condition. After conversion, the magnesium hydroxide is separated from the ammoniacal calcium nitrate lye by means of a filter press, washed out, dried and calcined.

The yield will be 20 kg. magnesia containing only 1.7% CaO. The calcium nitrate lye having a specific gravity of 1.35=40% $Ca(NO_3)_2$ will yield 180 kg. calcium nitrate after evaporation.

*Example II*

100 kg. crude dolomite are dissolved in 300 liters of nitric acid 1.23, and into this solution, under stirring, 5 kg. ammonia are introduced as gas. Then 38 kg. calcined and ground dolomite are mixed therewith by stirring while the liquid acquires a temperature of 50° centigrade. Conversion takes place rapidly, and after 15 minutes the magnesia is separated from the calcium nitrate solution by means of a filter press, dried and calcined. The yield will be 33.5 kg. with only 1.2% CaO content.

The ammoniacal calcium nitrate lye of 1.35 specific gravity is neutralized with nitric acid and when evaporated in vacuum yields 200 kg. calcium nitrate having 9% to 10% ammonium nitrate contents.

*Example III*

100 kg. crude dolomite are dissolved in 300 liters of nitric acid of 1.23 whereupon 40 liters of 25% ammonia are added under stirring; as soon as ferric hydroxide is precipitated, it can be removed by filtration. To the liquid containing already magnesium hydroxide and having an ammonia odor 38 kg. of calcined dolomite in small pieces are added, whereupon conversion will quickly take place with heating. Magnesia is separated from the ammoniacal calcium nitrate solution by means of the filter press having a specific gravity of 1.33, washed, dried and calcined. 34 kg. magnesia of 0.5% CaO content will be obtained and 175 kg. anhydrous calcium nitrate by evaporating the calcium nitrate lye.

*Example IV*

100 kg. crude dolomite are dissolved in 300 liters of nitric acid 1.23 and to this solution 48 kg. of ammonium nitrate are added. Then mix by stirring with 64 kg. calcined dolomite in lumps or powdered form. After conversion, separation, drying and calcination 43 kg. magnesia having only 1.4% CaO will be obtained, and the calcium nitrate lye having a specific gravity of 1.45=50% $Ca(NO_3)_2$ will yield 220 kg. anhydrous calcium nitrate when evaporated.

These examples may of course be correspondingly varied or supplemented, e. g. by the simultaneous introduction of ammonia and the addition of calcined dolomite. Furthermore, if the dolomite should be unevenly or poorly calcined, the desired substances can nevertheless be obtained in great purity by adding the dolomite in pieces and separating the conversion liquid from the particles that are not converted.

I claim:—

1. A method of producing magnesia deficient in lime besides a concentrated calcium nitrate solution by precipitating a solution of dolomite in nitric acid by a substance of the group consisting of lime and calcined dolomite, the precipitation taking place in the presence of ammonia.

2. A method of producing magnesia deficient in lime besides a concentrated calcium nitrate solution by precipitating a solution of dolomite in nitric acid by a substance of the group consisting of lime and calcined dolomite, the precipitation taking place in the presence of ammonium salts.

OTTO KIPPE.